United States Patent
Staihar

(10) Patent No.: US 8,366,081 B2
(45) Date of Patent: Feb. 5, 2013

(54) SYSTEM FOR MODERATING FORCES

(75) Inventor: Steven J. Staihar, Hillsboro, OR (US)

(73) Assignee: NIKE, Inc., Beaverton, OR (US)

( * ) Notice: Subject to any disclaimer, the term of this patent is extended or adjusted under 35 U.S.C. 154(b) by 1000 days.

(21) Appl. No.: 11/740,703

(22) Filed: Apr. 26, 2007

(65) Prior Publication Data

US 2008/0265477 A1    Oct. 30, 2008

(51) Int. Cl.
*F16F 1/00*    (2006.01)
(52) U.S. Cl. ............................. 267/69; 267/70
(58) Field of Classification Search .............. 267/69–72; 224/254
See application file for complete search history.

(56) References Cited

U.S. PATENT DOCUMENTS

| | | | |
|---|---|---|---|
| 1,026,566 A | 5/1912 | Cutler | |
| 1,364,427 A | 1/1921 | Corey | |
| 1,388,241 A | 8/1921 | Dierking | |
| 1,471,121 A | 9/1921 | Grasnick | |
| 1,692,079 A | 1/1927 | D'Alo | |
| 2,270,881 A | 8/1940 | Lang | |
| 3,752,270 A * | 8/1973 | Valdespino | 188/281 |
| 4,488,511 A * | 12/1984 | Grassano | 119/798 |
| 4,681,303 A | 7/1987 | Grassano | |
| 5,411,194 A | 5/1995 | Nagasawa et al. | |
| 5,450,995 A | 9/1995 | Perrin | |
| 5,615,811 A | 4/1997 | Bell et al. | |
| 5,695,102 A | 12/1997 | Jackson | |
| 5,884,827 A | 3/1999 | Stein | |
| 5,915,608 A | 6/1999 | Mao | |
| 6,092,574 A | 7/2000 | Krulik | |
| 6,158,374 A | 12/2000 | Free, Jr. | |
| 6,173,874 B1 | 1/2001 | Stein et al. | |
| 6,183,015 B1 * | 2/2001 | Smithson et al. | 280/805 |
| 6,375,053 B1 | 4/2002 | Cecchinel | |
| 6,422,541 B1 | 7/2002 | Yang | |
| 6,612,264 B2 | 9/2003 | Levine | |
| 6,619,523 B1 | 9/2003 | Duckworth | |
| 2005/0098590 A1 | 5/2005 | Collier et al. | |
| 2006/0186587 A1 * | 8/2006 | Mintgen | 267/124 |
| 2007/0262106 A1 * | 11/2007 | Fidrych et al. | 224/264 |

FOREIGN PATENT DOCUMENTS

| | | |
|---|---|---|
| EP | 1219856 A1 | 7/2002 |
| GB | 2333237 A | 7/1999 |

OTHER PUBLICATIONS

International Search Report and Written Opinion in PCT/US2008/056740, mailed Jul. 16, 2008.

\* cited by examiner

*Primary Examiner* — Bradley King
(74) *Attorney, Agent, or Firm* — Plumsea Law Group, LLC

(57) ABSTRACT

A moderation element may be incorporated into straps, handles, or other devices to moderate forces. As an example, a moderation element may include a housing and a fluid-filled chamber. The housing has an expandable configuration and defines an interior void. The housing also defines a pair of opposing compression surfaces within the interior void, with the compression surfaces being located to move toward each other when the housing expands. The chamber is located within the housing and between the compression surfaces.

21 Claims, 19 Drawing Sheets

SYSTEM FOR MODERATING FORCES

BACKGROUND OF THE INVENTION

A variety of articles incorporate straps or handles that assist with carrying the article. For example, a backpack generally incorporates a pair of straps that are configured to extend over both shoulders of an individual. Whereas the backpack often incorporates two straps, a messenger-style bag generally includes a single strap that extends over only one shoulder of the individual. Similarly, a golf bag conventionally includes either one strap or two straps that assist the individual with carrying golf equipment. Whereas straps extend over or contact a shoulder, handles are grasped by a hand and are often used on a piece of luggage, a briefcase, or a purse. Accordingly, different types of articles may incorporate a variety of shoulder strap configurations.

One consideration in the design of a strap or handle relates to comfort. In order to enhance the comfort of a strap or handle, compressible materials are often incorporated into areas that contact the individual, such as the shoulder or hand. With regard to straps, an advantage of compressible materials relates to decreased pressure concentrations on the shoulders of the individual, and particularly in areas of the shoulder that include the suprascapular nerve. When a strap extends over the shoulder, some areas of the shoulder experience greater loads than other areas of the shoulder, thereby forming pressure concentrations in the areas of greater loads. Compressible materials may be utilized, therefore, to distribute loads more evenly over a surface of the shoulder and decrease the pressure concentrations. Similar concepts apply to handles.

Examples of compressible materials suitable for straps and handles include polymer foams and fluid-filled bladders. U.S. Pat. No. 6,915,932 to Wolfe discloses a strap having a foam element and a fluid-filled bladder. The foam element defines various indentations, and the bladder is positioned within the indentations such that a combination of the foam element and the bladder provides cushioning when carrying an article. U.S. Pat. No. 6,223,959 to Chen discloses a strap for a golf bag, the strap having an envelope that encloses an air pocket formed of an inflated thermoplastic material. Similarly, U.S. Pat. Nos. 5,566,871 and 5,361,957 to Weintraub both disclose cushioning devices intended for use in a shoulder strap that incorporate an air-filled member.

SUMMARY OF THE INVENTION

An aspect of the invention relates to a moderation element that includes a housing and a fluid-filled chamber. The housing has an expandable configuration and defines an interior void. The housing also defines a pair of opposing compression surfaces within the interior void, with the compression surfaces being located to move toward each other when the housing expands. The chamber is located within the housing and between the compression surfaces. In some configurations, the moderation element may include an attachment member that secures the moderation element to an article.

Another aspect of the invention relates to a method of moderating forces that includes elongating a housing to decrease a distance between two compression surfaces located on opposite sides of a void within the housing. In addition, the method includes compressing a fluid-filled chamber located within the void and between the compression surfaces.

The advantages and features of novelty characterizing aspects of the invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention and the following Detailed Description of the Invention will be better understood when read in conjunction with the accompanying drawings.

DETAILED DESCRIPTION OF THE INVENTION

The following material and accompanying figures disclose a moderation element. Although the moderation element may be incorporated into a variety of articles, the strap is discussed and depicted as being incorporated into a strap for purposes of example. The strap is disclosed in combination with a computer bag, but concepts associated with the moderation element may also be utilized in combination with a wide range of other bag styles, including backpacks, briefcases, camera bags, duffel bags, golf bags, handbags, messenger bags, and purses, for example. The moderation element may also be incorporated into handles of backpacks, briefcases, camera bags, duffel bags, golf bags, handbags, messenger bags, and purses. In addition to bags, concepts associated with the strap may be utilized in combination with a variety of other articles, including photographic equipment (i.e., cameras), binoculars, belts, leashes, devices for mooring and towing applications, and a variety of athletic equipment types. Various harness configurations may also incorporate concepts associated with the strap, including seatbelts, hang gliding harnesses, parachuting harnesses, and horse tack, for example. An individual skilled in the relevant art will appreciate, therefore, that the concepts disclosed herein apply to strap configurations that are suitable for use with a variety of articles and for a wide variety of purposes.

Figure 1:
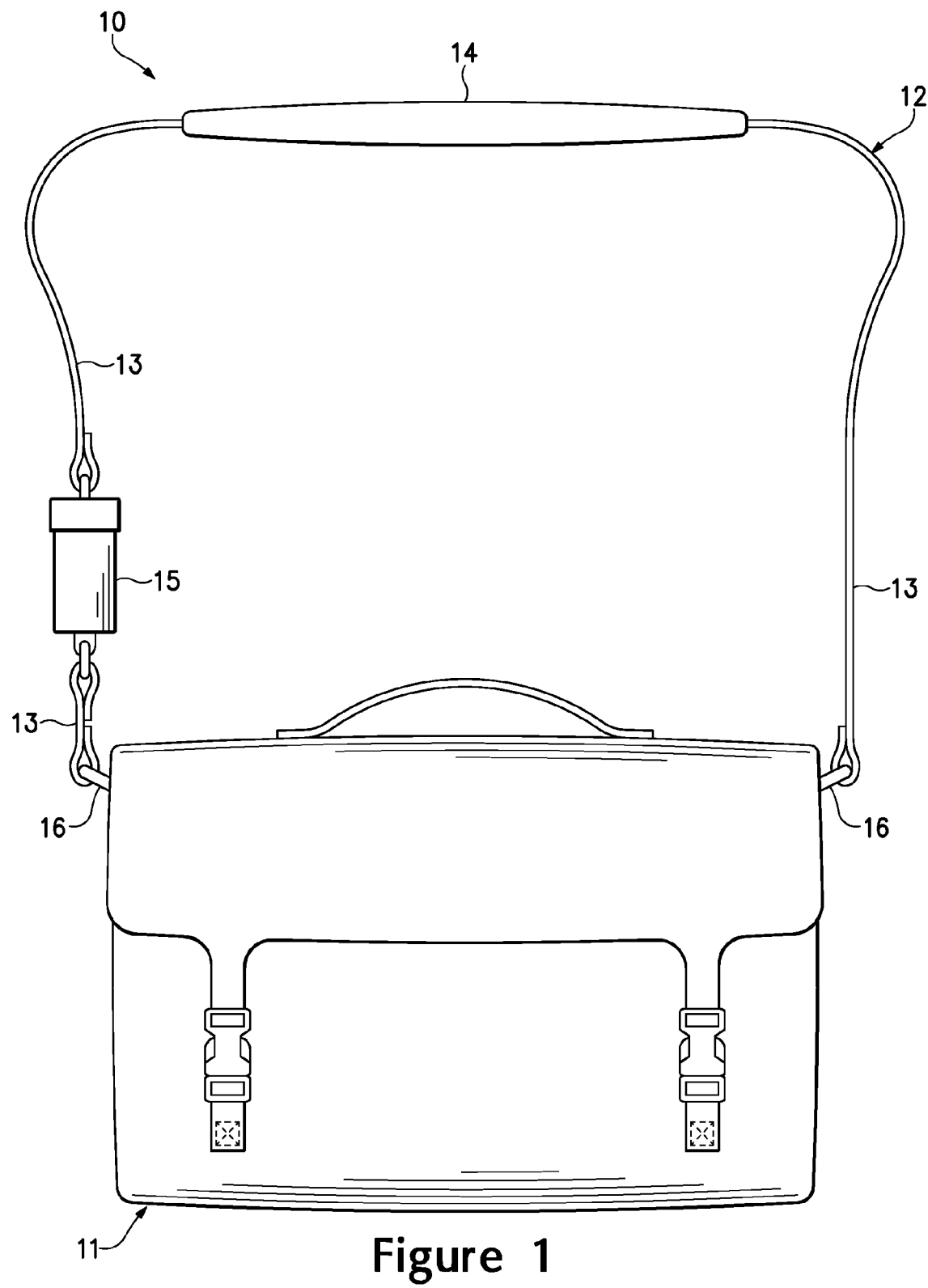
FIG. 1 is a front elevational view of a bag incorporating a strap with a first moderation element.

With reference to FIG. 1, a computer bag 10 is disclosed as including a container portion 11 and a carry strap 12. Bag 10 may be utilized to protect and transport various contents, including a notebook computer, accessories for the computer, and documents, for example. Accordingly, container portion 11 exhibits a generally conventional configuration that is substantially hollow and may contain pockets, protective dividers, or other features to accommodate the contents. Strap 12 is secured to container portion 11 in two locations to form a structure that extends over a shoulder of an individual, thereby permitting the individual to carry bag 10 and the contents. Although ring-style connectors 16 are depicted, a variety of other connection systems may be utilized to secure strap 12 to container portion 11.

Strap 12 includes an extension element 13, a support element 14, and a moderation element 15. In use, support element 14 rests upon the shoulder of the individual and extension element 13 extends downward from opposite sides of the shoulder to form a tensile member that bears or otherwise supports the weight of container portion 11 and the contents of container portion 11. Support element 14 forms a comfort-enhancing structure that distributes the weight of container portion 11 and the contents of container portion 11 over a surface of the shoulder. Moderation element 15 is incorporated into extension element 13 in order to moderate forces upon the shoulder. That is, moderation element 15 reduces or otherwise moderates the peak forces exerted upon the shoulder as the individual carries bag 10, thereby further enhancing the comfort of bag 10.

Extension element 13 has a two-part configuration that is secured to each of connectors 16 and opposite sides of moderation element 15. In some configurations, a length of extension element 13 may be adjustable so that the functional length of strap 12 may be modified by the individual. Extension element 13 may exhibit a generally flat configuration formed, for example, from nylon webbing. In further configurations, extension element 13 may be formed from a variety of other flexible materials, including rope, cord, chain or other structures capable of forming a tensile member that bears or otherwise supports the weight of container portion 11 and the contents of container portion 11. Accordingly, extension element 13 may exhibit a variety of configurations. In some configurations of bag 10, extension element 13 may have a one-part configuration such that moderation element 15 is secured to each of extension element 13 and container portion 11.

Support element 14 forms the primary point of contact between strap 12 and the shoulder of the individual. In order to enhance the comfort of strap 12, support element 14 may be formed from various cushioning materials that conform to the contours of the shoulder. Examples of suitable cushioning materials for support element 14 include polymer foams or fluid-filled chambers enclosed by a textile housing. In comparison with extension element 13, support element 14 exhibits a greater width in order to distribute the weight of container portion 11 and the contents of container portion 11 over a surface of the shoulder. Support element 14 extends around extension element 13 and is movable with respect to extension element 13. More particularly, extension element 13 and support element 14 are friction fit such that support element 14 is movable along the length of extension element 13. In further configurations, extension element 13 and support element 14 may be joined (e.g., with an adhesive, stitching, rivets) such that the positions of extension element 13 and support element 14 are fixed relative to each other.

Figure 2:
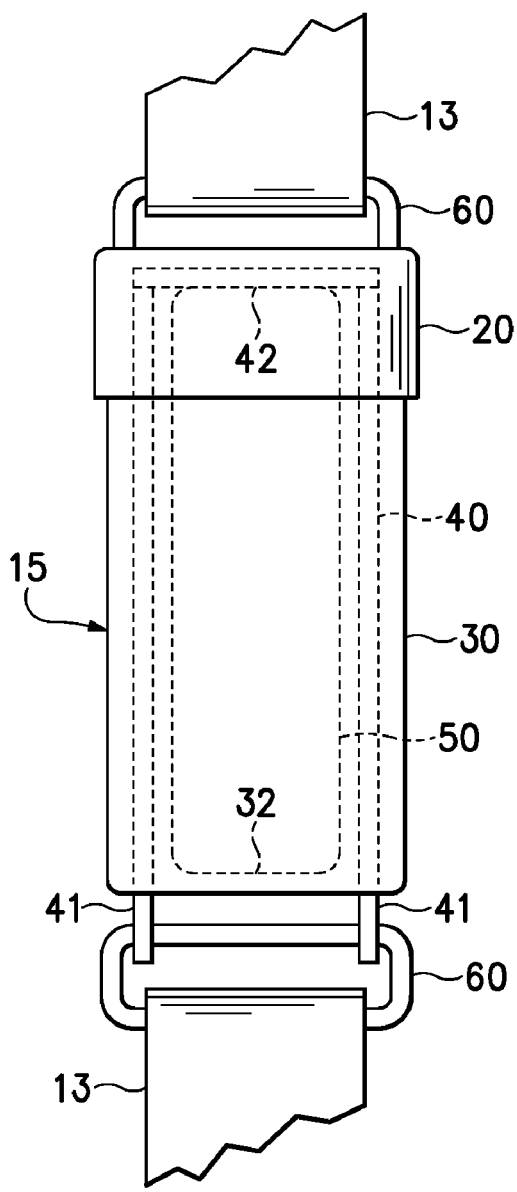
FIG. 2 is a side elevational view of a portion of the strap that includes the first moderation element.
Figure 3:
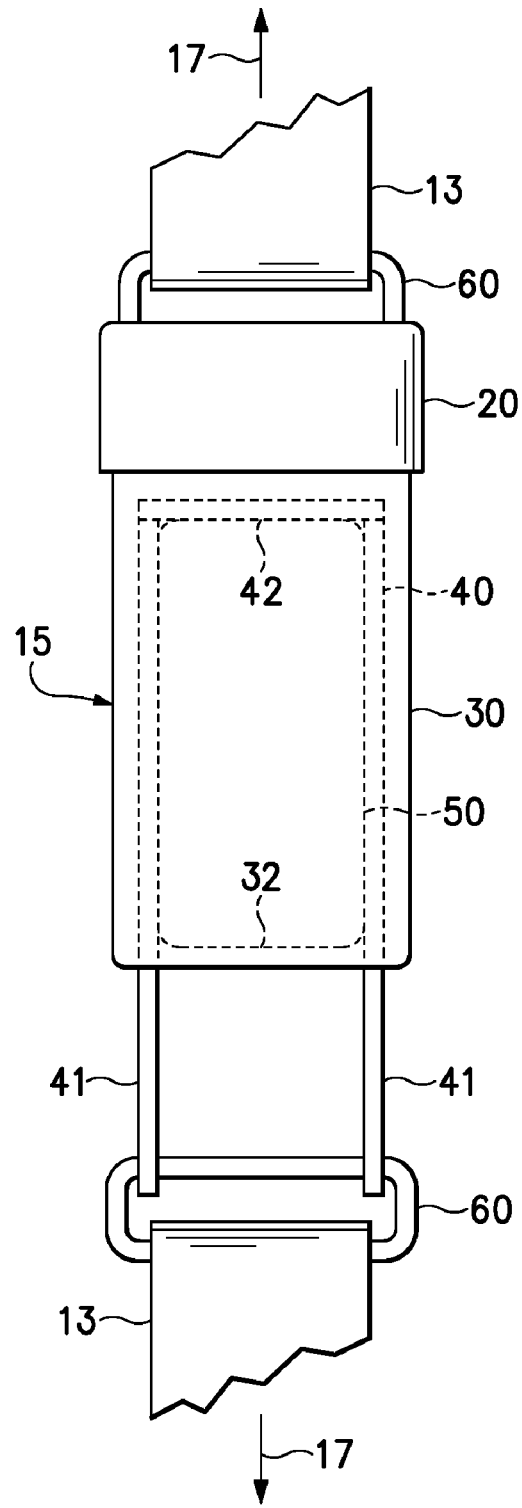
FIG. 3 is a side elevational view corresponding with FIG. 2 and depicting the portion of the strap with the first moderation element in a tensile state.
Figure 4:
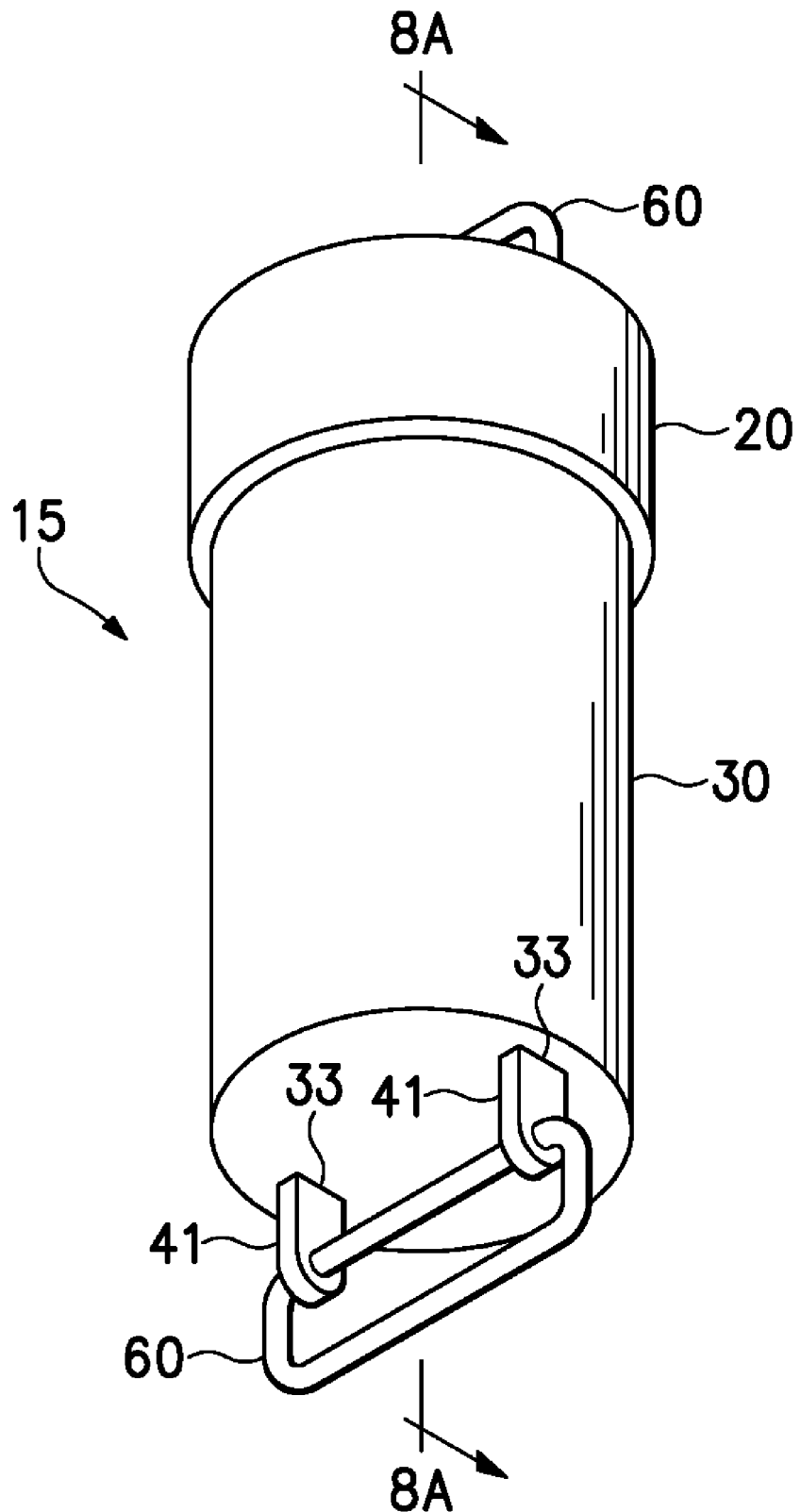
FIG. 4 is a perspective view of the first moderation element.
Figure 5:
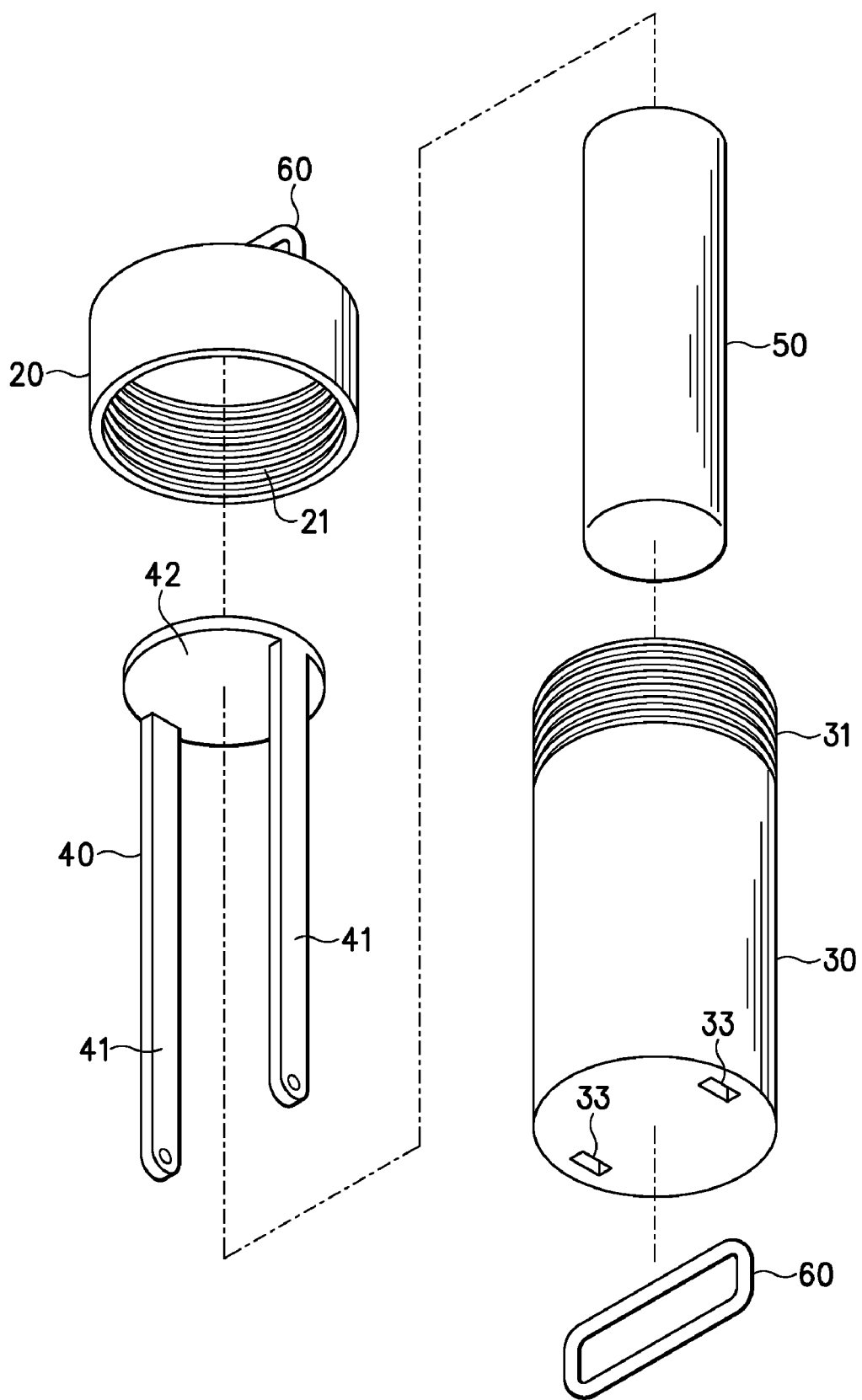
FIG. 5 is an exploded perspective view of the first moderation element.
Figure 6:
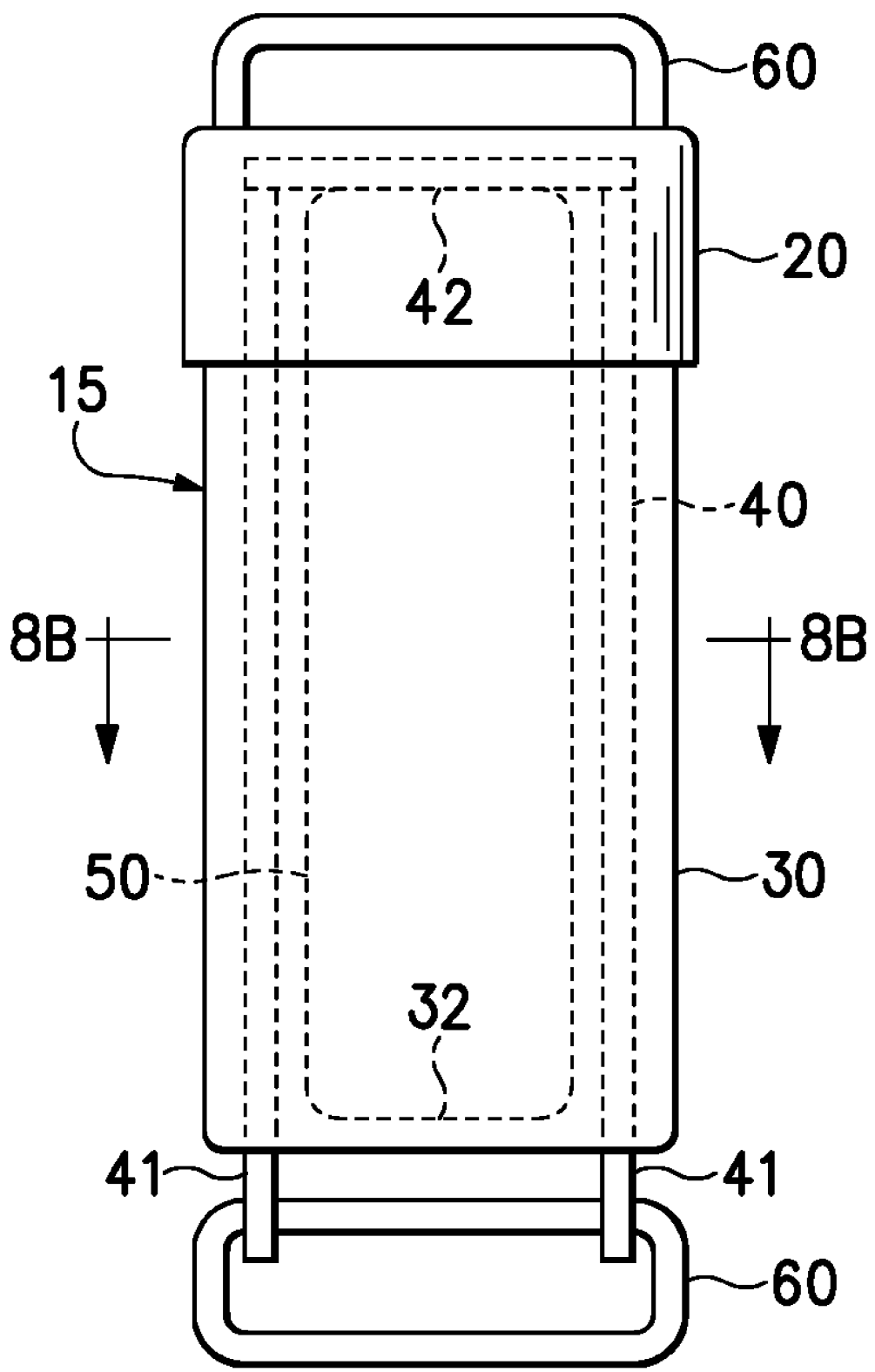
FIG. 6 is a side elevational view of the first moderation element.
Figure 7:
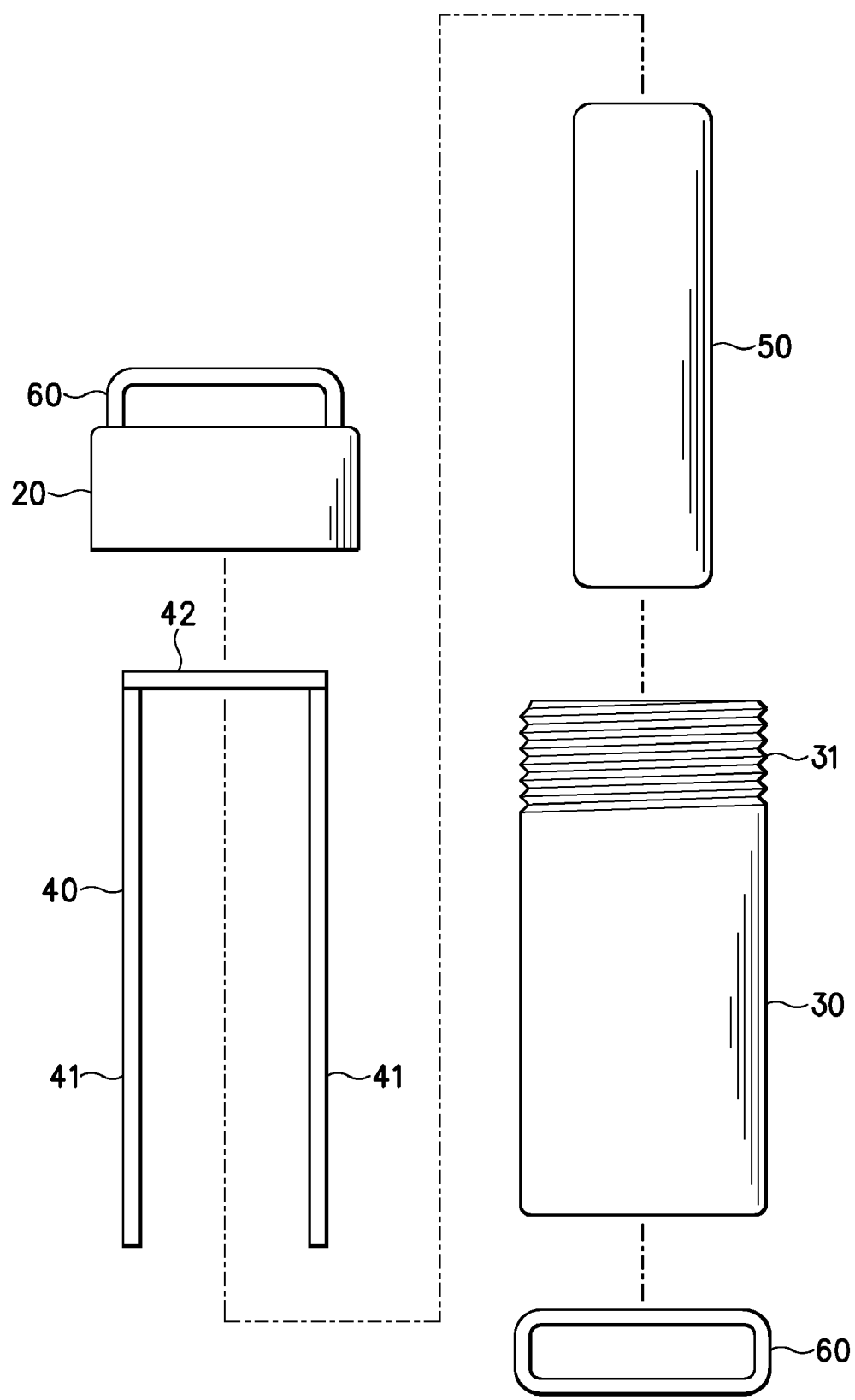
FIG. 7 is an exploded side elevational view of the first moderation element.
Figure 8A:
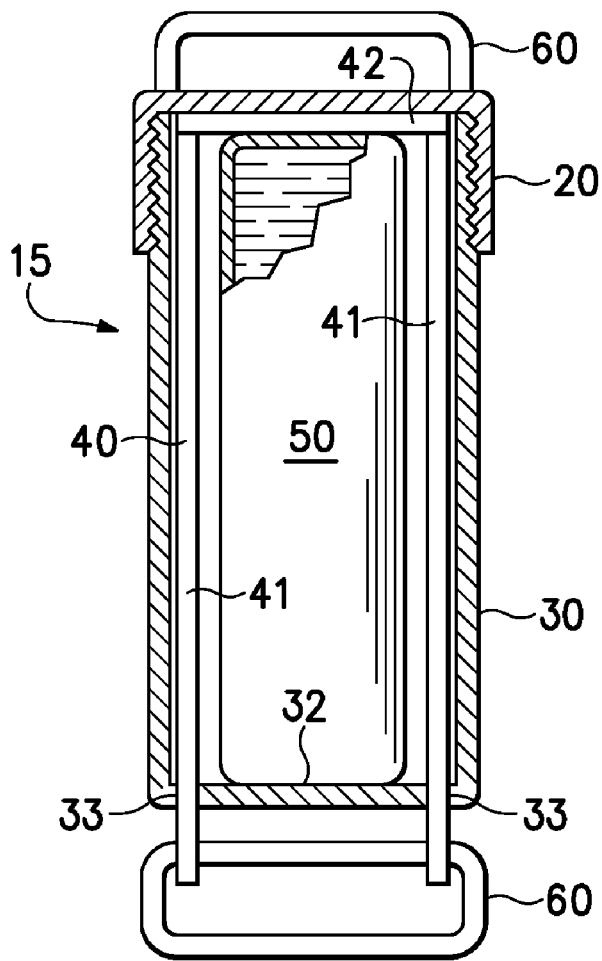
FIGS. 8A and 8B are cross-sectional views of the first moderation element, as defined by section lines 8A and 8B respectively in FIGS. 4 and 6.
Figure 8B:
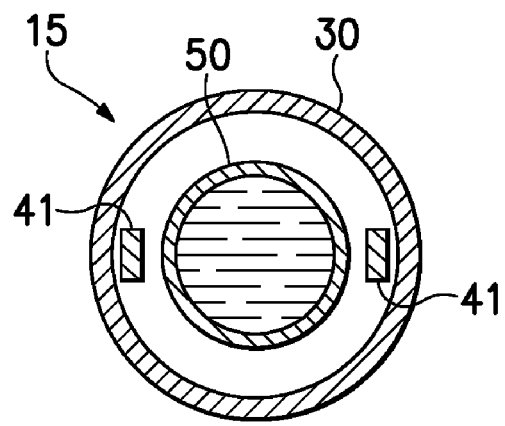

Moderation element 15 has a structure that expands and contracts to moderate forces exerted upon the shoulder as the individual carries bag 10. Referring to FIGS. 1-3, moderation element 15 is depicted as being incorporated into extension element 13 such that tensile forces upon extension element 13 are transferred to moderation element 15. That is, moderation element 15 experiences tensile forces that are substantially equal in magnitude to tensile forces induced in extension element 13. As moderation element 15 expands in response to the tensile forces in extension element 13, however, the peak tensile forces in extension element 13 are reduced or otherwise moderated, thereby lessening the peak forces exerted upon the shoulder as the individual carries bag 10.

With reference to FIGS. 4-8B, the primary components of moderation element 15 are depicted as a cap 20, an outer housing member 30, an inner housing member 40, a compression member 50, and a pair of attachment rings 60. Cap 20 forms an end area of moderation element 15 and has a generally cylindrical and concave configuration with an interior diameter substantially equal to an outer diameter of outer housing member 30. Various threads 21 are formed within cap 20 and mate with various threads 31 on outer housing member 30. Accordingly, cap 20 and outer housing member 30 may be joined by intermeshing threads 21 and 31. One of attachment rings 60 extends outward from cap 20 to form a structure that joins with extension element 13.

Outer housing member 30 has a generally cylindrical configuration with a hollow interior shaped to receive both inner housing member 40 and compression member 50. As noted above, threads 31 form an area for joining outer housing member 30 to cap 20. The end opposite threads 31 is closed and defines a first compression surface 32 within moderation element 15. As discussed in greater detail below, compression member 50 contacts and is compressed against first compression surface 32 when moderation element 15 is under tension. A pair of apertures are defined in and extend through first compression surface 32.

Inner housing member 40 has a pair of elongate extensions 41 that are substantially parallel to each other and extend outward from a second compression surface 42. Inner housing member 40 fits within the hollow interior of outer housing member 30 such that extensions 41 protrude through apertures 33. In addition, compression member 50 is located between extensions 41 and contacts second compression surface 42. As discussed in greater detail below, compression member 50 contacts and is compressed against second compression surface 42 when moderation element 15 is under tension. Another of attachment rings 60 extends through extensions 41 to form a structure that joins with extension element 13.

A variety of materials may be utilized for cap 20, housing members 30 and 40, and attachment rings 60, including various polymer materials and metals. When formed from polymer materials, an injection-molding process or compression-molding process, for example, may be utilized to form cap 20, housing members 30 and 40, or attachment rings 60 from polyester, thermoset urethane, thermoplastic urethane, various nylon formulations, blends of these materials, or various other polymer materials. In addition, cap 20, housing members 30 and 40, or attachment rings 60 may be formed from a high flex modulus polyether block amide, such as PEBAX, which is manufactured by the Atofina Company. Polyether block amide provides a variety of characteristics that benefit moderation element 15, including relatively high impact resistance at low temperatures, few property variations in the temperature range of minus 40 degrees Celsius to positive 80 degrees Celsius, and resistance to degradation by a variety of chemicals. Another suitable material for cap 20, housing members 30 and 40, or attachment rings 60 is a polybutylene terephthalate, such as HYTREL, which is manufactured by E.I. duPont de Nemours and Company. Composite materials may also be formed by incorporating glass fibers or carbon fibers into the polymer materials discussed above in order to enhance the strength of cap 20, housing members 30 and 40, or attachment rings 60. When formed from metal materials, milling or casting processes may be utilized to shape steel, stainless steel, and aluminum, for example, into cap 20, housing members 30 and 40, or attachment rings 60. In some configurations, some of cap 20, housing members 30 and 40, or attachment rings 60 may be formed from a polymer material, and the remainder of cap 20, housing members 30 and 40, or attachment rings 60 may be formed from a metal material. Additionally, individual components of moderation element 15 may be formed from both polymer and metal materials.

Compression member 50 is depicted as having a configuration of a fluid-filled chamber with a substantially cylindrical shape. More particularly, compression member 50 has a shape that fits within outer housing member 30 and between extensions 41 of inner housing member 40. Compression member 50 has an outer barrier formed of a polymer material that encloses a fluid pressurized between zero and three-hundred-fifty kilopascals (i.e., approximately fifty-one pounds per square inch) or more. In some configurations, compression member 50 may incorporate a valve that permits the individual to adjust the pressure of the fluid within compression member 50. As discussed below, a wide range of polymer materials may be utilized for the outer barrier of compression member 50. In selecting materials for the outer barrier of compression member 50, engineering properties of the material (e.g., tensile strength, stretch properties, fatigue characteristics, dynamic modulus, and loss tangent) as well as the ability of the material to prevent the diffusion of the fluid contained by compression member 50 may be considered. When formed of thermoplastic urethane, for example, the outer barrier of compression member 50 may have a thickness of approximately 0.040 inches, but the thickness may range from 0.010 inches to 0.080 inches or more, for example.

Examples of polymer materials that may be suitable for compression member 50 include thermoplastic urethane, polyurethane, polyester, polyester polyurethane, and polyether polyurethane. In addition, compression member 50 may be formed from a material that includes alternating layers of thermoplastic polyurethane and ethylene-vinyl alcohol copolymer, as disclosed in U.S. Pat. Nos. 5,713,141 and 5,952,065 to Mitchell, et al. A variation upon this material may also be utilized, wherein a center layer is formed of ethylene-vinyl alcohol copolymer, layers adjacent to the center layer are formed of thermoplastic polyurethane, and outer layers are formed of a regrind material of thermoplastic polyurethane and ethylene-vinyl alcohol copolymer. Another suitable material for compression member 50 is a flexible microlayer membrane that includes alternating layers of a gas barrier material and an elastomeric material, as disclosed in U.S. Pat. Nos. 6,082,025 and 6,127,026 to Bonk, et al. Additional suitable materials are disclosed in U.S. Pat. Nos. 4,183,156 and 4,219,945 to Rudy. Further suitable materials include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340; 6,203,868; and 6,321,465 to Bonk, et al. In addition to air and nitrogen, the fluid contained by compression member 50 may be any of the gasses disclosed in U.S. Pat. No. 4,340,626 to Rudy, such as hexafluoroethane and sulfur hexafluoride, for example. In addition, the fluid may include octafluorapropane.

A variety of manufacturing techniques may be utilized to form compression member 50, including blowmolding, thermoforming, and rotational molding, for example. With regard to the blowmolding technique, thermoplastic material is placed in a mold having the general shape of compression member 50 and pressurized air is utilized to induce the material to coat surfaces of the mold. In the thermoforming technique, heated layers of thermoplastic material are placed between corresponding portions of a mold, and the mold is utilized to compress the layers together at peripheral locations of compression member 50. A positive pressure may be applied between the layers of thermoplastic material to induce the layers into the contours of the mold. In addition, a vacuum may be induced in the area between the layers and the mold to draw the layers into the contours of the mold. In the rotational molding technique, thermoplastic material is placed in a mold that subsequently rotates to induce the thermoplastic material to coat or otherwise form a layer upon surfaces of the mold.

Although compression member 50 is depicted as being a single fluid-filled chamber, compression member 50 may also be multiple stacked fluid-filled chambers that enclose fluids with different pressures. In some configurations, compression member 50 may also form subchambers that each include fluids with different pressures. In further configurations, a foam or textile member may be incorporated into an interior of compression member 50, or more rigid polymer member may be secured to an exterior of compression member 50.

In operation, moderation element 15 reduces or otherwise moderates the peak forces exerted upon the shoulder as the individual carries bag 10, thereby enhancing the comfort of bag 10. In general, a tensile force in extension element 13 is transferred to moderation element 15 through attachment rings 60 and induces housing members 30 and 40 to compress compression member 50. Whereas extension element 13 may not stretch significantly from the tensile force, moderation element 15 increases in length while compressing compression member 50 to impart a cushioning effect to strap 12. The manner in which moderation element 15 moderates the peak forces will be described in greater detail below.

Although a majority of inner housing member 40 is located within outer housing member 30, housing members 30 and 40 are unsecured to each other and may move relative to each other. With reference to FIG. 2, moderation element 15 is depicted in a configuration wherein extension element 13 is not in tension. In the non-tensioned state, (a) a majority of the length of extensions 41 is located within outer housing member 30, (b) second compression surface 42 of inner housing member 40 is located adjacent the end of outer housing member 30 having cap 20, and (c) compression member 50 is in a substantially non-compressed state.

As a comparison with FIG. 2, FIG. 3 depicts moderation element 15 in a configuration wherein extension element 13 is in tension, as represented by force arrows 17. When subjected to a tensile force, housing members 30 and 40 move relative to each other so that (a) extensions 41 extend further outward from within outer housing member 30, (b) second compression surface 42 of inner housing member 40 moves toward first compression surface 32 and away from the end of outer housing member 30 having cap 20, and (c) compression member 50 is compressed between compression surfaces 32. Although the overall length of moderation element 15 increases due to the tensile force, compression member 50 is compressed and may decrease in length. Accordingly, a tensile force upon moderation element 15 induces a compressive force in compression member 50.

Figure 9A:
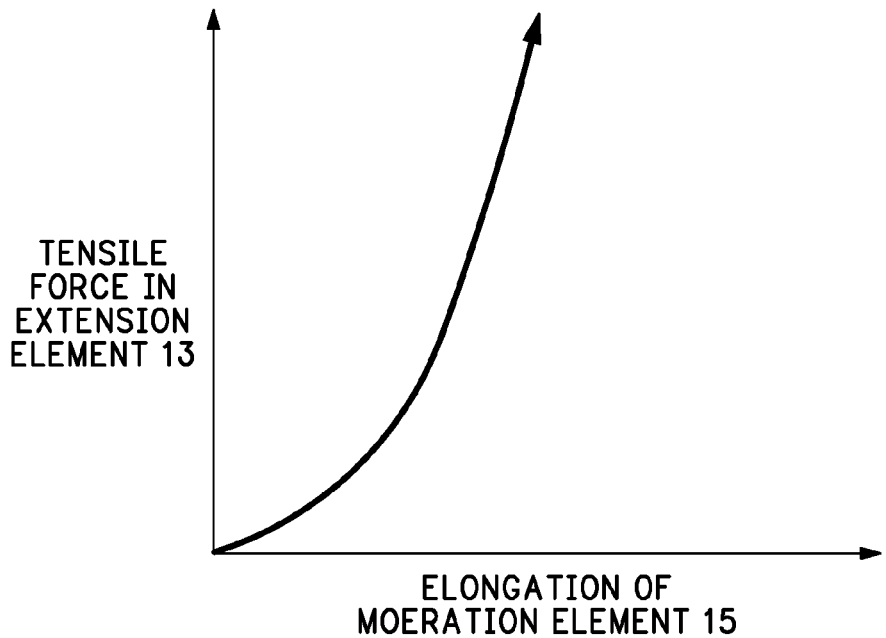
FIGS. 9A and 9B are graphs depicting aspects of the operation of the first moderation element.

As moderation element 15 elongates or otherwise expands in response to the tensile force, compression member 50 is compressed between compression surfaces 32 and 42 and resists the elongation. The degree to which compression member 50 resists the elongation is related to the magnitude of the tensile force. In general, therefore, as the tensile force increases, the degree to which compression member 50 resists the elongation also increases. With reference to FIG. 9A, a graph depicting the relationship between the tensile force in extension element 13 and the elongation of moderation element 15 is depicted. Although the tensile force upon moderation element 15 may theoretically increase without limit, the degree to which moderation element 15 elongates is limited. Based upon the structure of moderation element 15, second compression surface 42 of inner housing member 40 is located adjacent the end of outer housing member 30 having cap 20 in the non-tensioned state. As the tensile force increases, however, second compression surface 42 moves toward first compression surface 32 to compress compression member 50 therebetween. In theory, therefore, maximum elongation of moderation element 15 occurs when compression surfaces 32 and 42 are adjacent to each other.

Figure 9B:
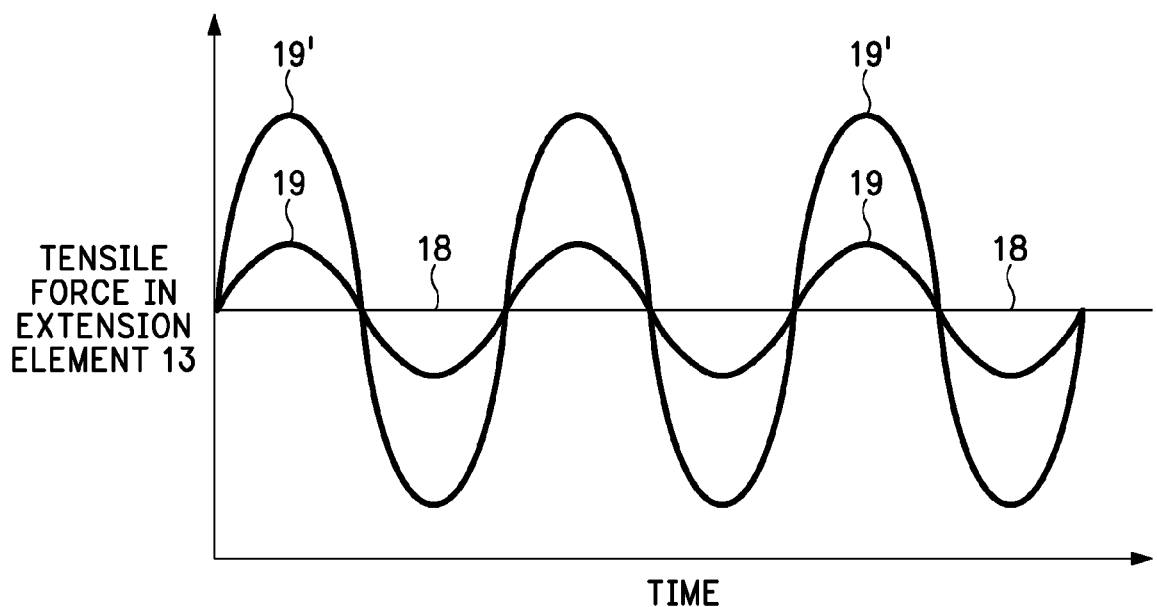
Figure 10:
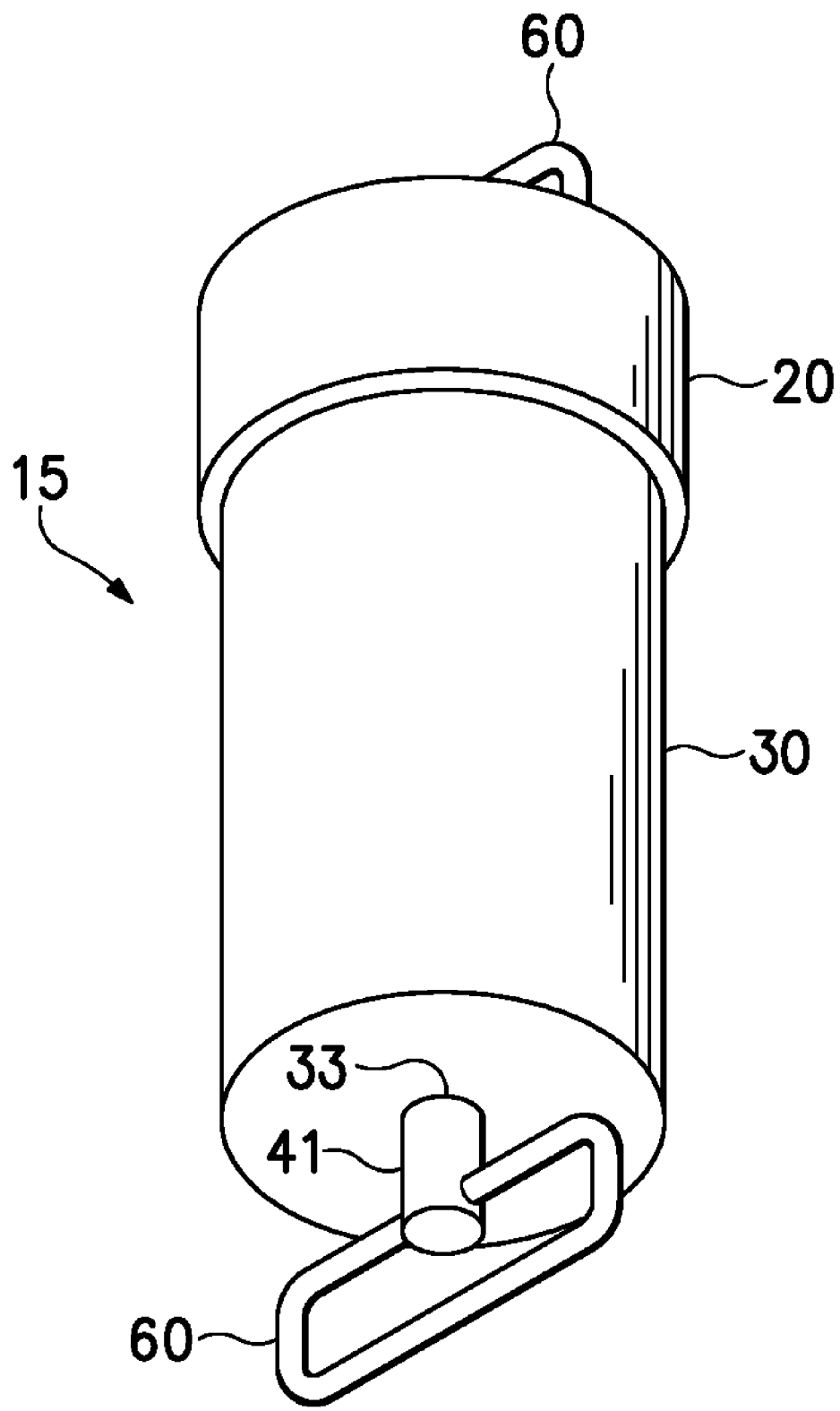
FIG. 10 is a perspective view of a second moderation element.
Figure 11:
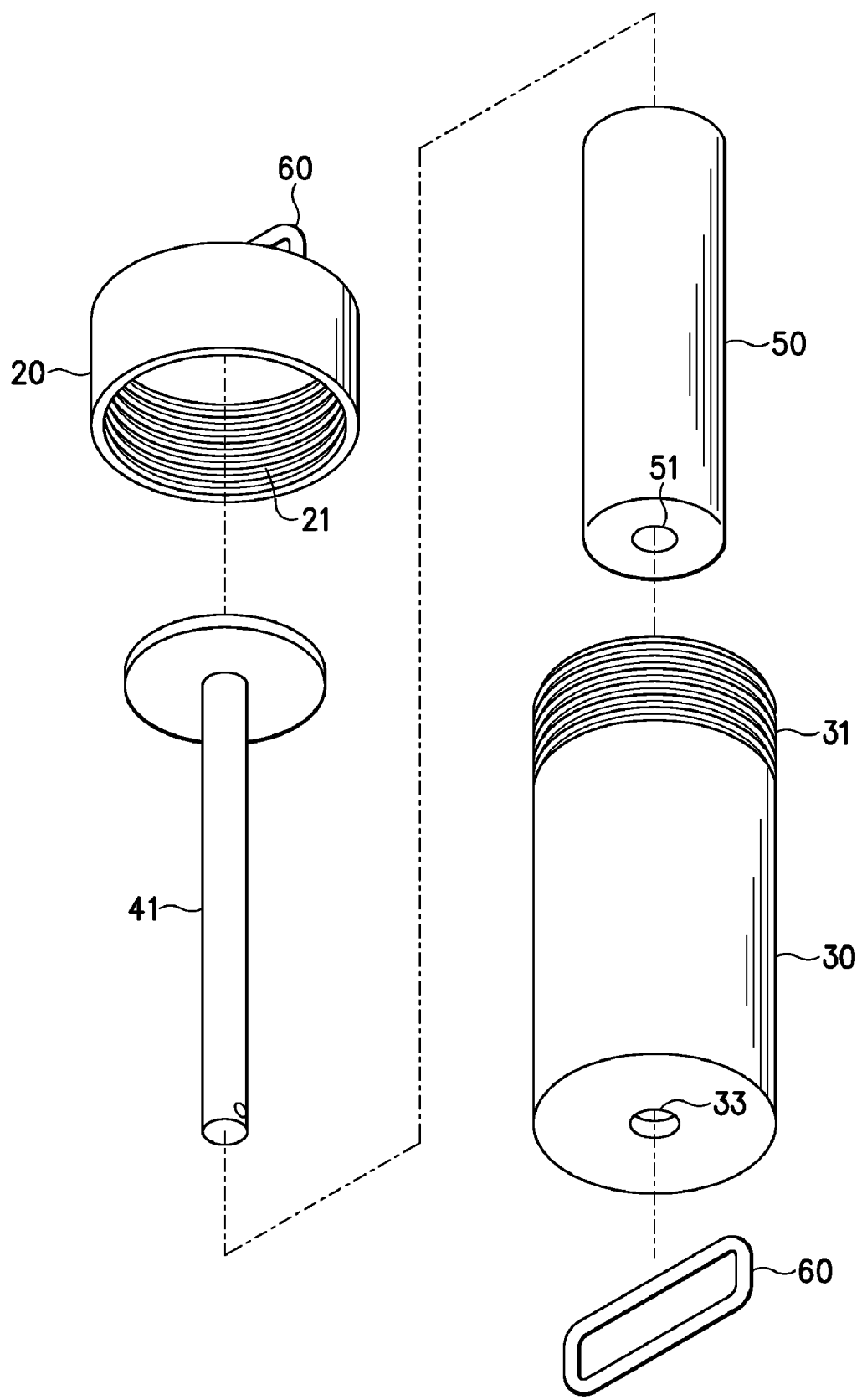
FIG. 11 is an exploded perspective view of the second moderation element.
Figure 12:
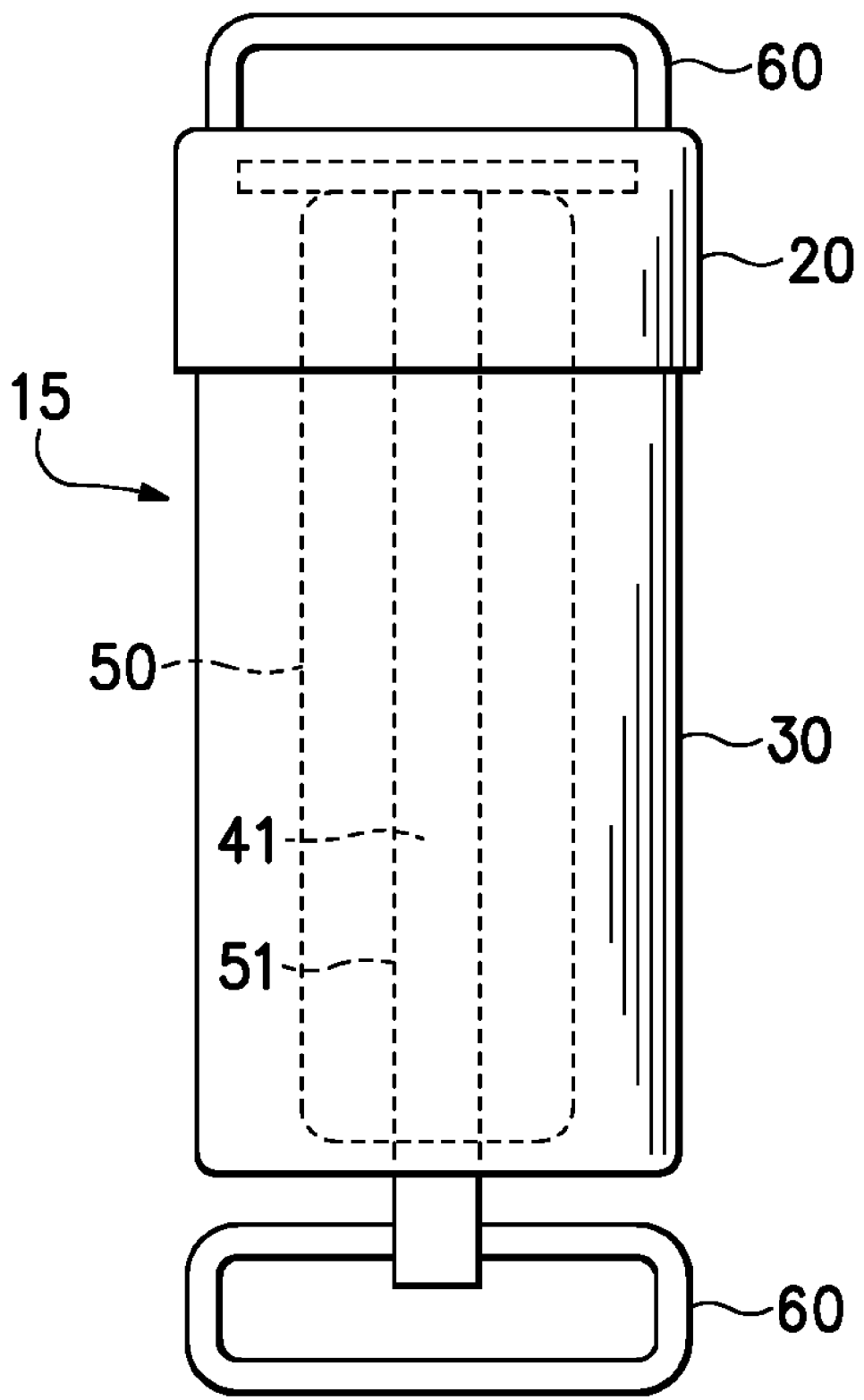
FIG. 12 is a side elevational view of the second moderation element.
Figure 13:
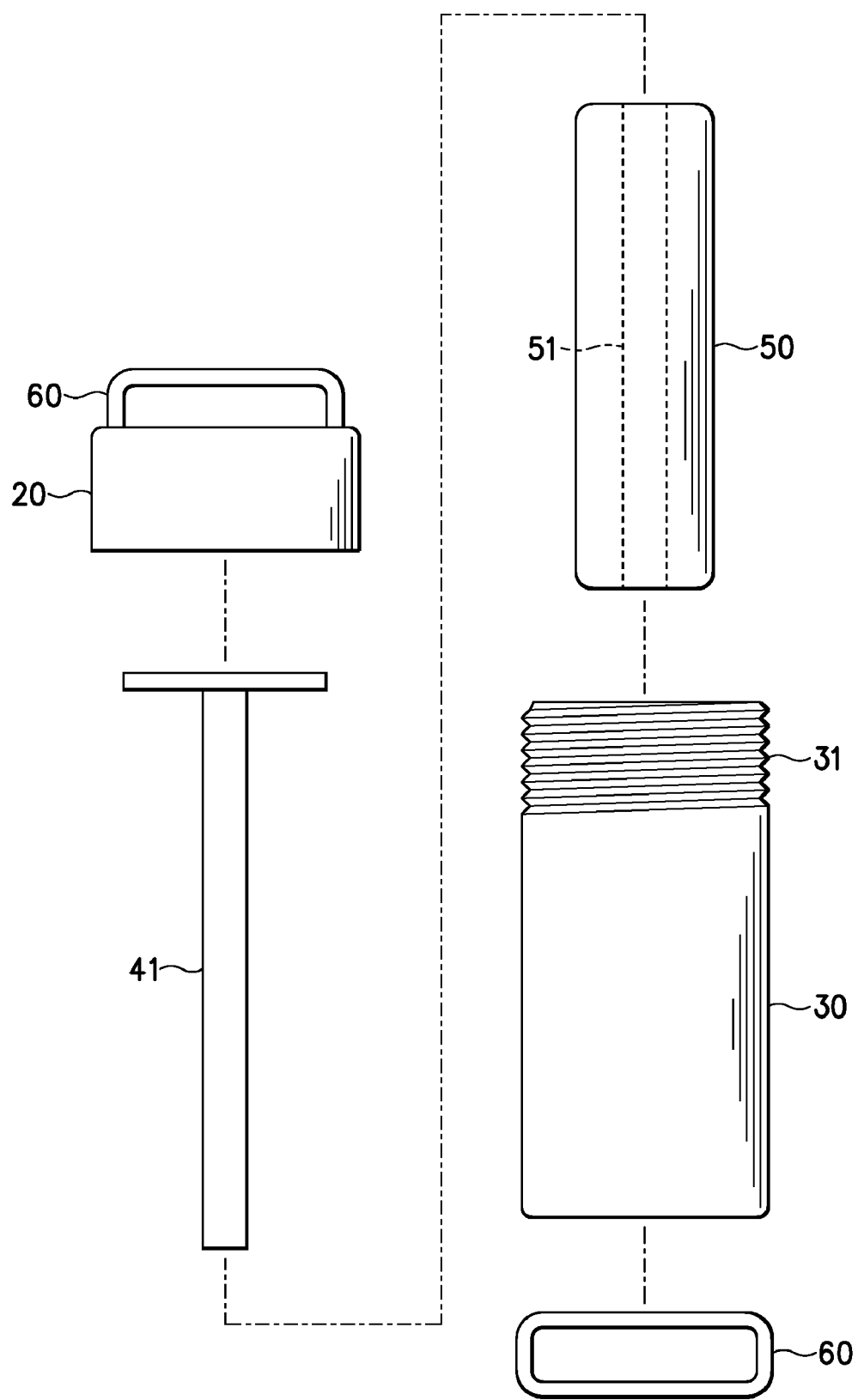
FIG. 13 is an exploded side elevational view of the second moderation element.
Figure 14:
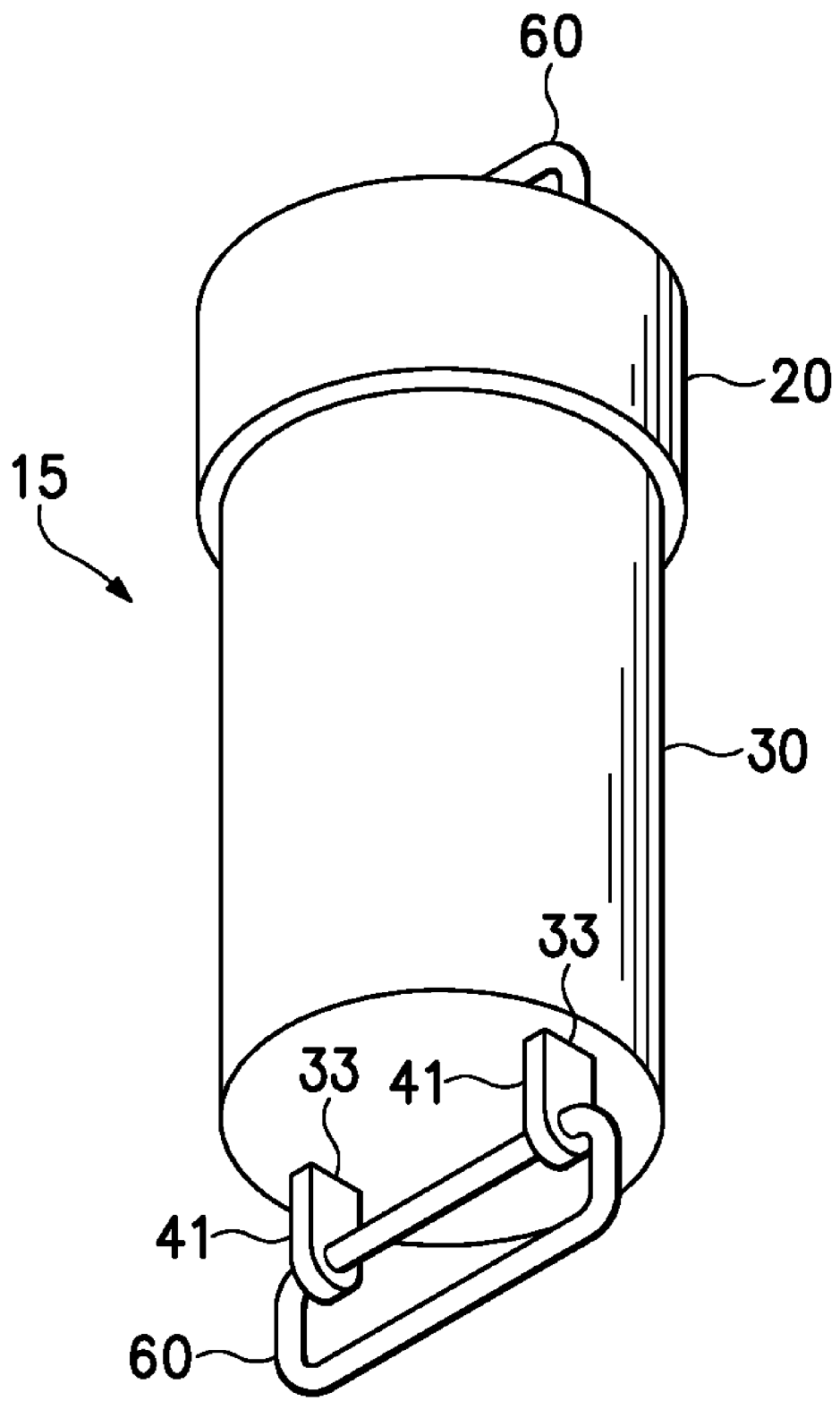
FIG. 14 is a perspective view of a third moderation element.
Figure 15:
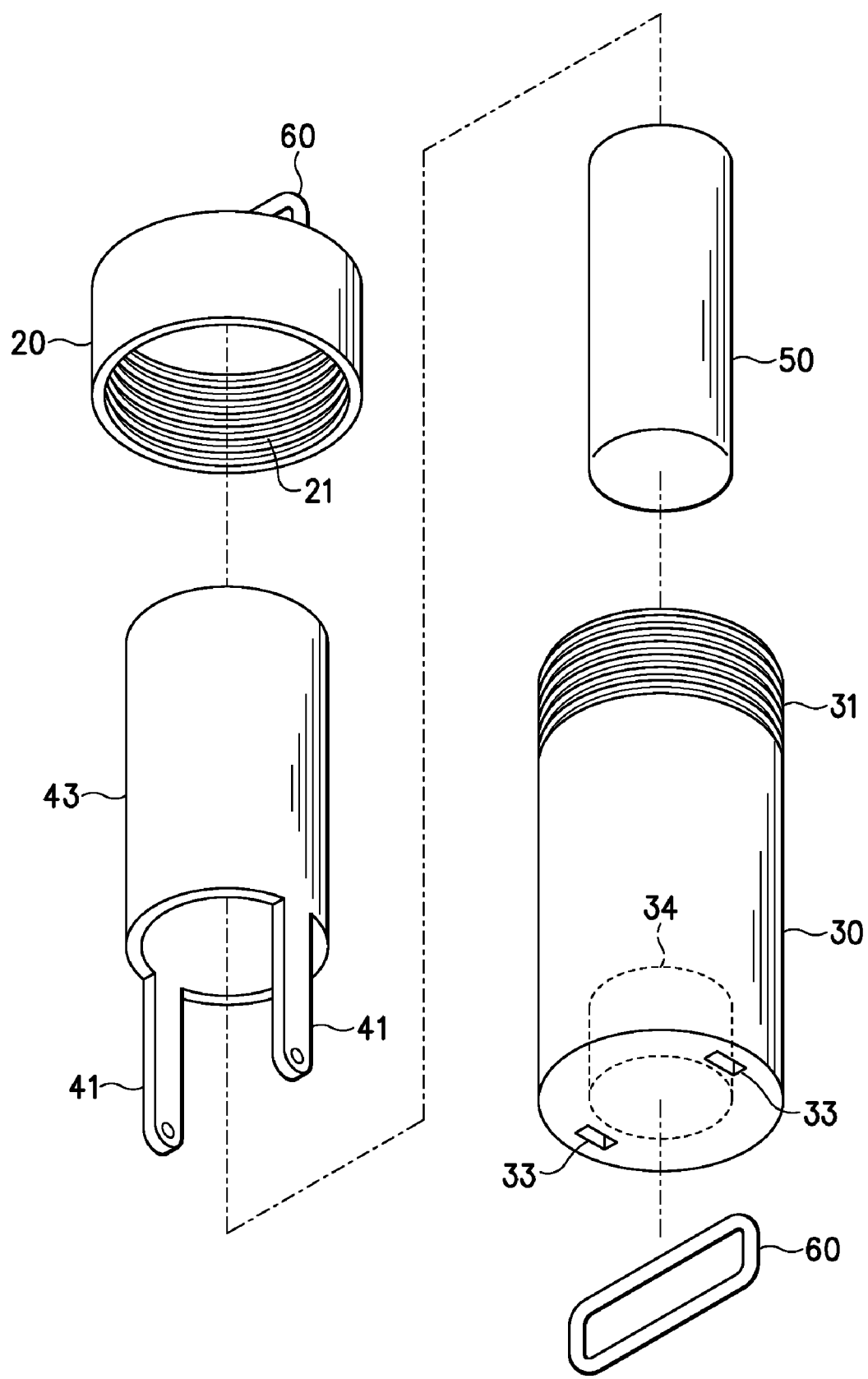
FIG. 15 is an exploded perspective view of the third moderation element.
Figure 16:
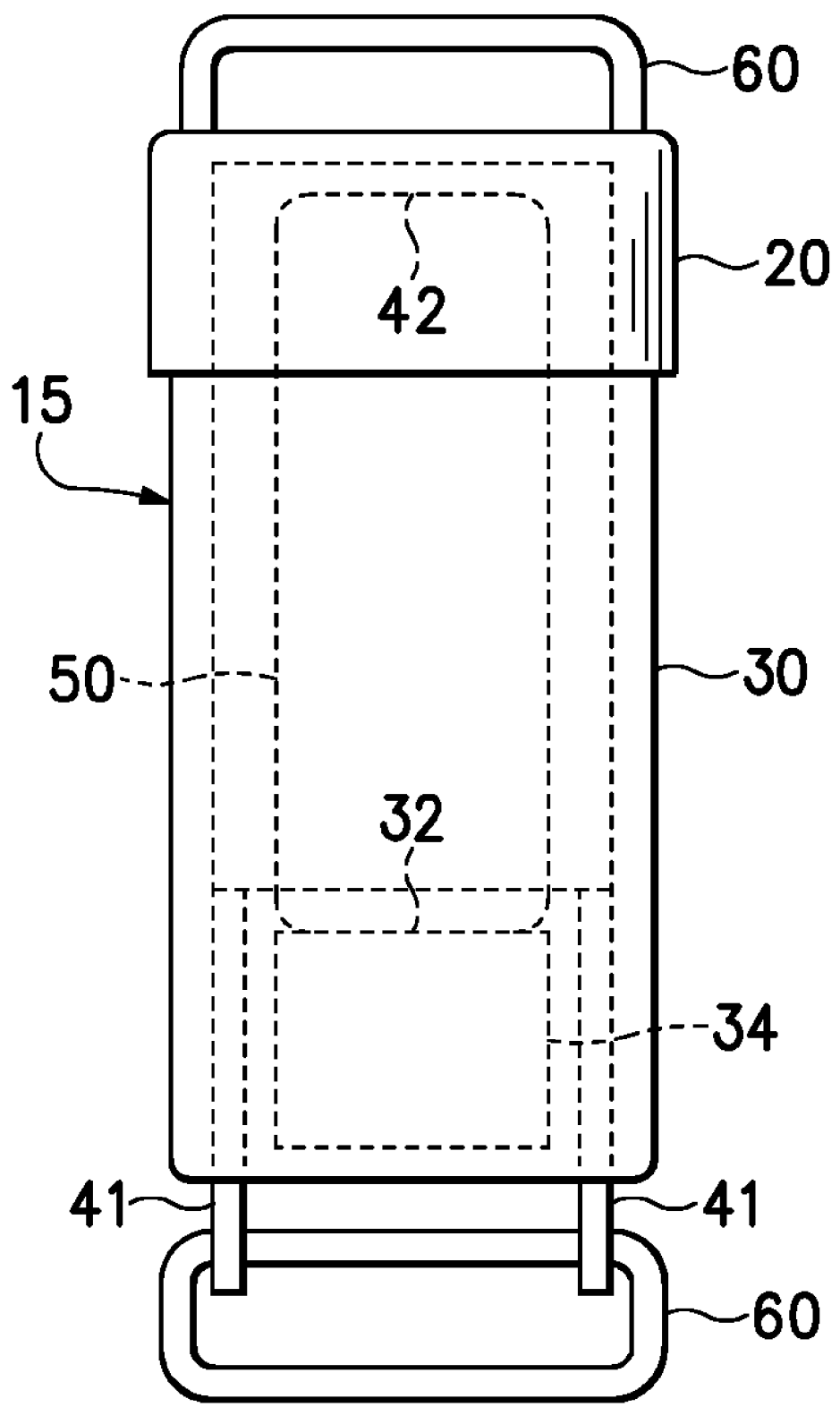
FIG. 16 is a side elevational view of the third moderation element.
Figure 17:
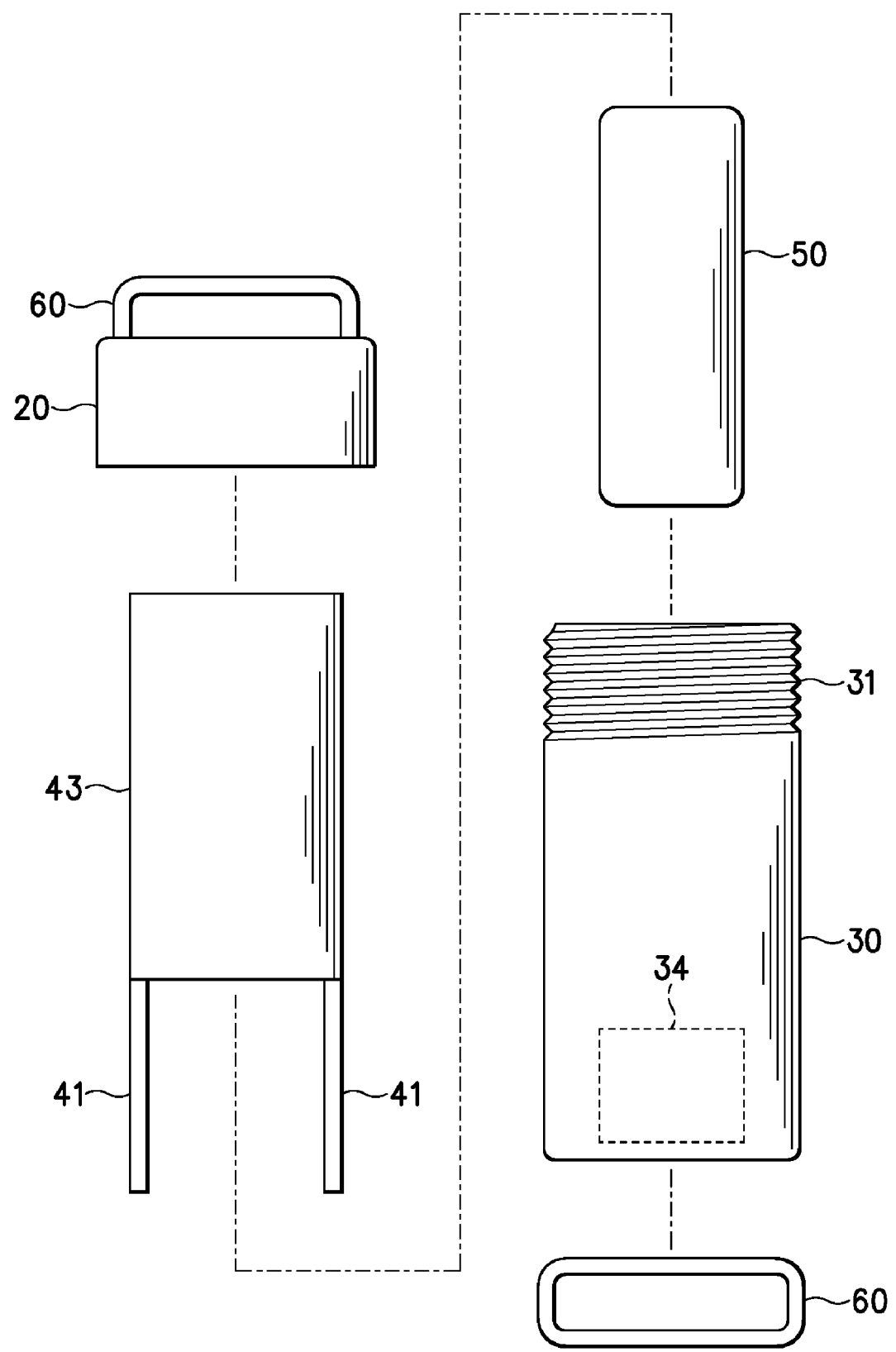
FIG. 17 is an exploded side elevational view of the third moderation element.

When strap 12 is placed over the shoulder of the individual, extension element 13 is placed in tension due to the downward force of bag 10 and the contents of container portion 11. Referring to FIG. 9B, a graph depicting the relationship between the tensile force in extension element 13 and time is depicted for various scenarios. The tensile force in extension element 13 depends upon a variety of factors, including the mass of bag 10, the mass of the contents of container portion 11, and the activity that the individual is engaged in (e.g., standing still or walking). When the individual is standing still, the tensile force in extension element 13 remains substantially constant, as represented by line 18 in FIG. 9B. That is, the combined mass of bag 10 and the contents of container portion 11 induce a constant tensile force in extension element 13 when the individual is standing still.

As the individual walks or runs, for example, the tensile force in extension element 13 may vary in a sinusoidal manner, as represented by line 19 in FIG. 9B. More particularly, the motion of the individual in upward and downward directions as the individual walks or runs may cause the tensile force in extension element 13 to repeatedly increase and decrease. That is, the inertia of bag 10 and the contents of container portion 11 may induce the tensile force to vary with the motion of the individual. Note that the sinusoidal change in the tensile force in extension element 13 is centered about line 18. Accordingly, the motion of the individual may repeatedly induce the tensile force to (a) increase above the level of the constant tensile force of line 18 and (b) decrease below the level of the constant tensile force of line 18, with the average tensile force being equal to the constant tensile force of line 18.

While line 19 represents the tensile force in extension element 13 when moderation element 15 is incorporated into strap 12, line 19' represents the tensile force in extension element 13 when moderation element 15 is absent from strap 12. In comparing line 19 with line 19', it is evident that the overall change in tensile forces as the individual moves are greater when moderation element 15 is absent. While moderation element 15 reduces the peak tension in extension element 13, moderation element 15 may also increase the lowest tension in extension element 13. When comparing lines 19 and 19', both have a generally sinusoidal shape. Line 19, however, has less amplitude than line 19'. Moderation element 15 serves, therefore, to moderate the tensile forces in extension element 13. Because the maximum tension in extension element 13 is directly related to the degree to which strap 12 is compressed against the shoulder of the individual, moderation element 15 reduces the peak compressive forces experienced by the individual. From the perspective of the individual, therefore, the presence of moderation element 15 reduces the peak compressive forces felt by the shoulder, thereby making the act of carrying bag 10 more comfortable.

An advantage of forming cap 20 and outer housing member 30 to include threads 21 and threads 31 relates to the adjustability of moderation element 15. The distance between compression surfaces 32 and 42 is at least partially determined by the degree to which cap 20 is screwed onto outer housing member 30. As cap 20 is screwed onto outer housing member 30, the distance between compression surfaces 32 and 42 decreases. More particularly, when cap 20 is initially placed in contact with outer housing member 30 and rotated, the distance between compression surfaces 32 and 42 will be greater than when cap 20 is fully screwed onto outer housing member 30. By varying or adjusting the distance between compression surfaces 32 and 42, the amount of initial compression of compression member 50 may be adjusted. Accordingly, threads 21 and threads 31 effectively provide a means of adjusting the degree to which moderation element 15 moderates forces. Depending upon the length of compression member 50 and the dimensions of the various portions of moderation element 15, threads 21 and threads 31 may not impart adjustability in some configurations. In addition to threads, a variety of other structures that may or may not impart adjustability may be utilized to secure cap 20 to outer housing member 30.

As discussed in detail above, tension in extension element 13 due to carrying bag 10 and the contents of container portion 11 is transferred to moderation element 15 through attachment rings 60. When moderation element 15 is subjected to a tensile force, housing members 30 and 40 move relative to each other such that (a) compression surfaces 32 and 42 translate toward each other and (b) compression member 50 is compressed between compression surfaces 32 and 42. This action serves to moderate forces in extension element 13 and reduce peak forces upon the shoulder of the individual, thereby enhancing the comfort associated with carrying bag 10.

While the configuration of moderation element 15 discussed above and depicted in the figures provides a suitable structure, various alternate configurations may also be utilized. For example, outer housing member 30 is depicted as having a substantially cylindrical shape with a circular cross-section, but may have an elliptical, triangular, square, rectangular, or hexagonal cross-section. In some configurations, one end of moderation element 15 may be secured directly to container portion 11, with the other end being secured to extension element 13. While compression member 50 may be a fluid-filled chamber, other configurations may utilize a spring or foam member for compression member 50. Additionally, inner housing member may be formed to have three or more extensions 41, rather than the two extensions 41 depicted in the figures. Accordingly, the configuration of moderation element 15 may vary substantially.

Another configuration of moderation element 15 is depicted in FIGS. 10-13. In comparison with the configuration shown in FIGS. 4-8B, inner housing member 40 is depicted as having a configuration with a single extension 41 that protrudes outward from a center of second compression surface 42. To accommodate the single extension 41, compression member 50 defines a channel 51 that extends through a center and along a longitudinal axis of compression member 50. When assembled, extension 41 extends through channel 51 and protrudes outward from outer housing member 30. In operation, the configuration of moderation element 15 depicted in FIGS. 10-13 responds in the manner described above. That is, tensile forces in extension element 13 tend to elongate moderation element 15 and compress compression member 50, thereby moderating forces in strap 12.

A further configuration of moderation element 15 is depicted in FIGS. 14-17. In this configuration, inner housing member 40 has a cylindrical portion 43 that defines an interior area for receiving compression member 50, and extensions 41 extend outward from cylindrical portion 43. In addition, a protrusion 34 is formed within outer housing member 30, and protrusion 34 has a diameter that fits within cylindrical portion 43. In operation, protrusion 34 extends within cylindrical portion 43 as compression member 50 is compressed. In comparison with previously-discussed configurations of moderation element 15, this configuration imparts a limiting feature to the degree to which (a) moderation element 15 may be elongated and (b) compression member 50 may be compressed. As protrusion 34 extends within cylindrical portion 43, inner housing member 40 contacts first compression surface 32, thereby preventing further elongation and compression.

An advantage to configurations involving protrusion 34 relates to the adjustability of moderation element 15. As discussed above, threads 21 and threads 31 impart adjustability to moderation element 15. By varying or adjusting the distance between compression surfaces 32 and 42, the amount of initial compression of compression member 50 may be adjusted. Accordingly, threads 21 and threads 31 effectively provide a means of adjusting the degree to which moderation element 15 moderates forces. Similarly, protrusion 34 may be utilized to vary or adjust the distance between compression surfaces 32 and 42. More particularly, the degree to which protrusion 34 extends into the void within moderation element 15 may be adjusted through a threaded system or other movement system. By modifying the position of protrusion 34, the distance between compression surfaces 32 and 42 may be adjusted. Accordingly, protrusion 34 provides another means of adjusting the degree to which moderation element 15 moderates forces.

Figure 18:
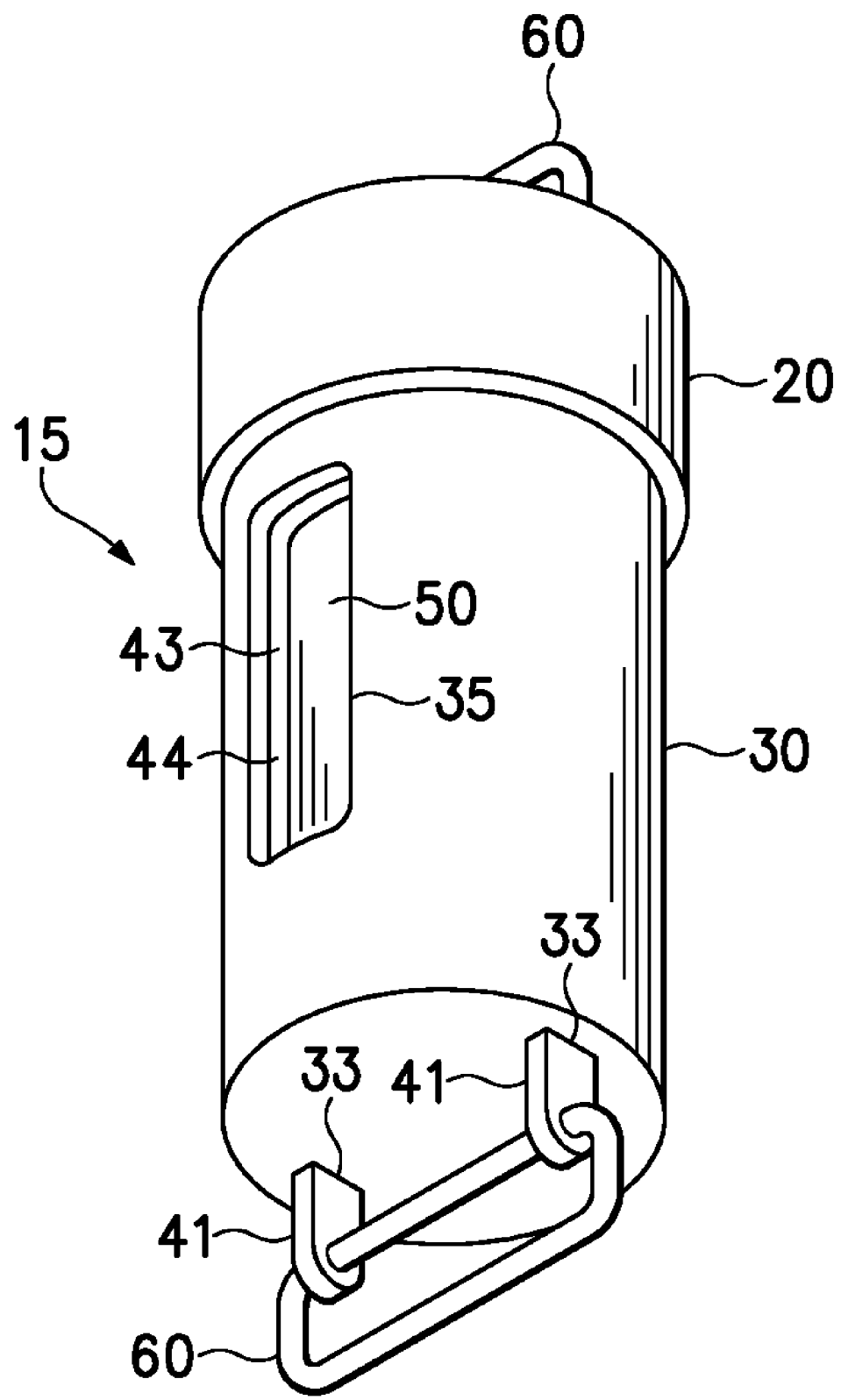
FIG. 18 is a perspective view of a fourth moderation element.
Figure 19:
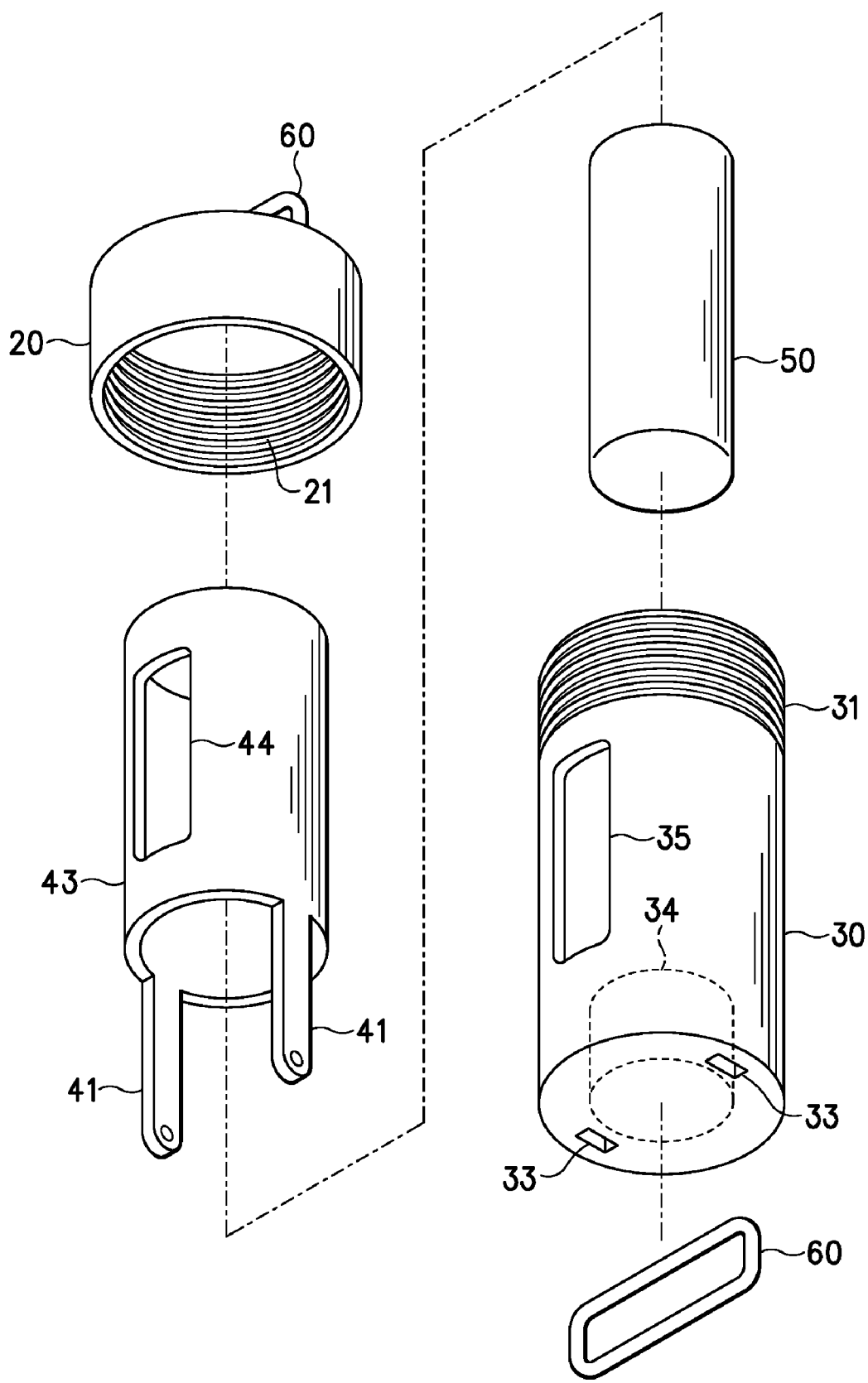
FIG. 19 is an exploded perspective view of the fourth moderation element.

Yet another configuration is depicted in FIGS. 18 and 19, wherein outer housing member 30 defines an aperture 35 and inner housing member 40 defines an aperture 44. When assembled, apertures 35 and 44 align to expose a portion of compression member 50. In addition to aesthetic benefits, apertures 35 and 44 provide compression member 50 with areas to expand through while being compressed. That is, compression member 50 may protrude outward through apertures 35 and 44 during compression.

Figure 20:
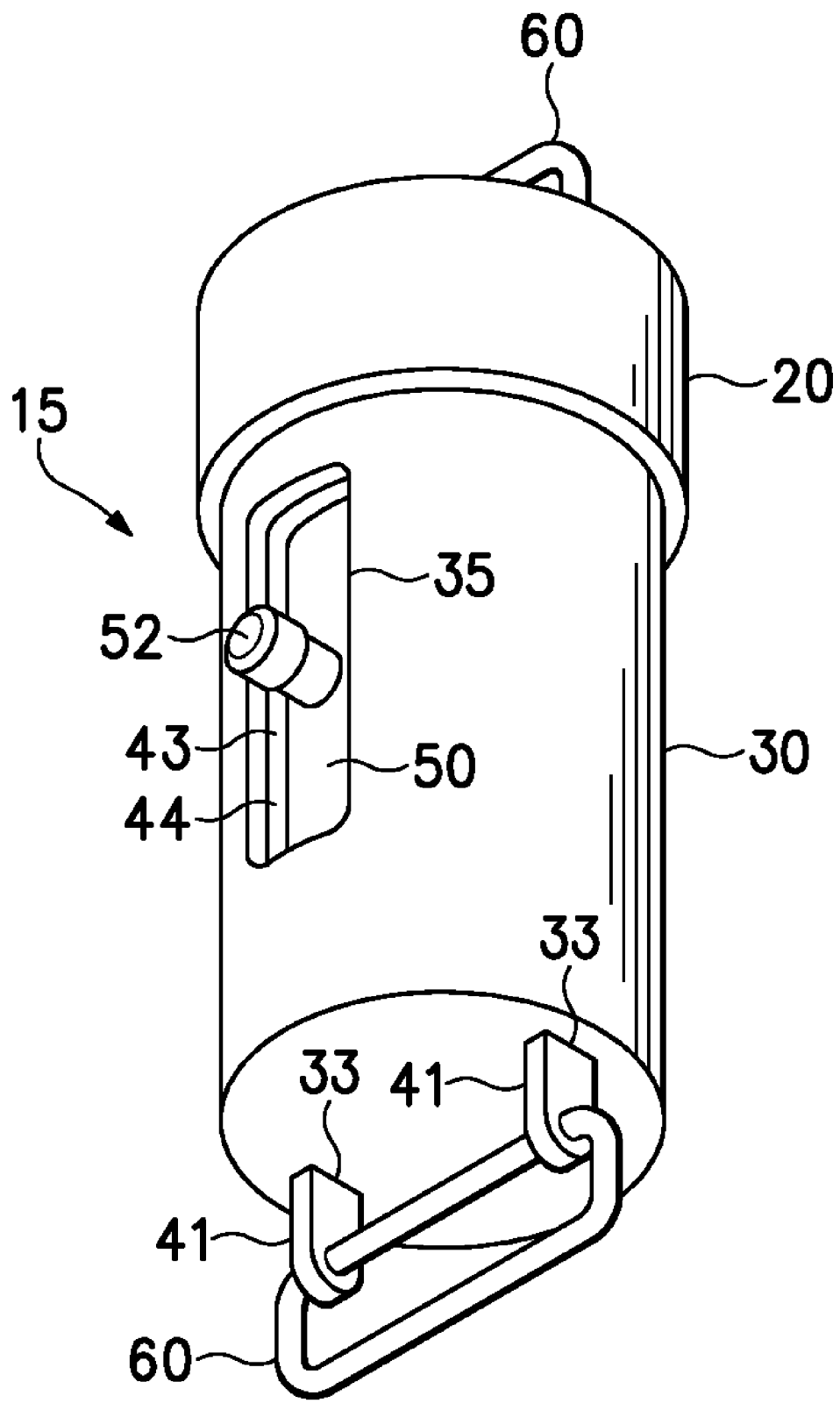
FIG. 20 is a perspective view of another configuration of the fourth moderation element.

As a variation upon the configuration depicted in FIGS. 18 and 19, a valve 52 is depicted in FIG. 20 as extending outward from compression member 50 and through apertures 35 and 44. Valve 52 permits the individual to adjust the pressure of the fluid within compression member 50. Depending upon the mass of the contents of bag 10 or the preferences of the individual, greater or lesser pressure may be desired in compression member 50. In general, as the pressure within compression member 50 increases, the force necessary to lengthen moderation element 15 (i.e., compress compression member 50) increases. Similarly, as the pressure within compression member 50 decreases, the force necessary to lengthen moderation element 15 decreases. Accordingly, valve 50 permits the individual to adjust the cushioning characteristics of moderation element 15. Although valve 52 is depicted as being accessible from an exterior of moderation element 15, valve 52 may be accessible only by disassembling moderation element 15 in some configurations. As noted above, other configurations of moderation element 15 may utilize a spring or foam member for compression member 50. In contrast with a spring or foam member, the use of a fluid-filled chamber and valve permits moderation element 15 to be adjusted.

The invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. A strap for carrying an article, the strap including a moderation element comprising:
 a housing with an expandable configuration, the housing defining an interior void, and the housing defining a pair of opposing compression surfaces within the interior void; and
 a fluid-filled chamber located within the interior void and between the compression surfaces, the chamber being formed from a polymer barrier that encloses a pressurized fluid and the chamber having an elongated shape with opposite ends relative to a long axis of the fluid-filled chamber;
 wherein the compression surfaces are located at the opposite ends of the fluid-filled chamber; and
 wherein the compression surfaces are located to move toward each other along the long axis of the fluid-filled chamber when the housing expands.

2. The strap recited in claim 1, wherein the housing includes a first housing member and a second housing member, the first housing member defining one of the compression surfaces, and the second housing member defining another of the compression surfaces.

3. The strap recited in claim 2, wherein the second housing member extends into the first housing member.

4. The strap recited in claim 2, wherein the first housing member and the second housing member each define a portion of the interior void.

5. The strap recited in claim 2, wherein the first housing member extends around the chamber, and the second housing member extends through the chamber.

6. The strap recited in claim 2, wherein the chamber defines a channel extends through a central area of the chamber, the first housing member extends around the chamber, and the second housing member extends through the channel.

7. The strap recited in claim 2, wherein the first housing member and the second housing member each have cylindrical shapes that extend around the chamber.

8. The strap recited in claim 1, wherein the housing defines an aperture that exposes a portion of the chamber.

9. The strap recited in claim 1, wherein the chamber includes a valve.

10. A strap for carrying an article, the strap including a moderation element and an extension element, the moderation element comprising:
- a chamber formed from a polymer material that encloses a fluid, the chamber having an elongate configuration with a first end and an opposite second end;
- a housing that includes:
  - an inner housing member that defines an interior void shaped to receive the chamber, the inner housing member having a first end and an opposite second end, the first end of the inner housing member defining a compression surface that contacts the first end of the chamber, and
  - an outer housing member that defines an interior void shaped to receive the inner housing member and the chamber, the outer housing member having a first end and an opposite second end, the second end of the outer housing member defining a compression surface that contacts the second end of the chamber; and
- at least one attachment member that secures the moderation element to the extension element.

11. The strap recited in claim 10, wherein the inner housing member and outer housing member are movable to elongate the housing and compress the chamber.

12. The strap recited in claim 10, wherein the inner housing member and the outer housing member each have cylindrical shapes that extend around the chamber.

13. The strap recited in claim 10, wherein the housing defines an aperture that exposes a portion of the chamber.

14. The strap recited in claim 10, wherein each of the inner housing member and the outer housing member define an aperture that exposes a portion of the chamber.

15. The strap recited in claim 10, wherein the chamber includes a valve.

16. A method of moderating forces in a strap for carrying an article, the method comprising steps of:
- incorporating a housing and a fluid-filled chamber into the strap, the chamber being located within a void in the housing, the chamber having an elongated shape with opposite ends relative to a long axis of the chamber; and
- elongating the housing along the long axis to decrease a distance, along the long axis, between two compression surfaces located on opposite sides of the void and at the opposite ends of the chamber, thereby compressing the chamber between the compression surfaces, the chamber including a polymer barrier that encloses a pressurized fluid.

17. The method recited in claim 16, wherein the step of elongating includes inducing tension in an extension element that is secured to the housing.

18. The method recited in claim 16, wherein the step of elongating includes moving a first housing member of the housing and a second housing member of the housing relative to each other.

19. The method recited in claim 16, wherein the step of compressing includes increasing a pressure of a fluid within the chamber.

20. The method recited in claim 16, further including a step of shortening the housing to increase a distance between the two compression surfaces.

21. The method recited in claim 16, wherein the chamber includes a valve.

* * * * *